Nov. 20, 1934.  F. J. WOOLFENDEN  1,981,576
FLUID PRESSURE REGULATOR
Original Filed May 25, 1928    2 Sheets-Sheet 1
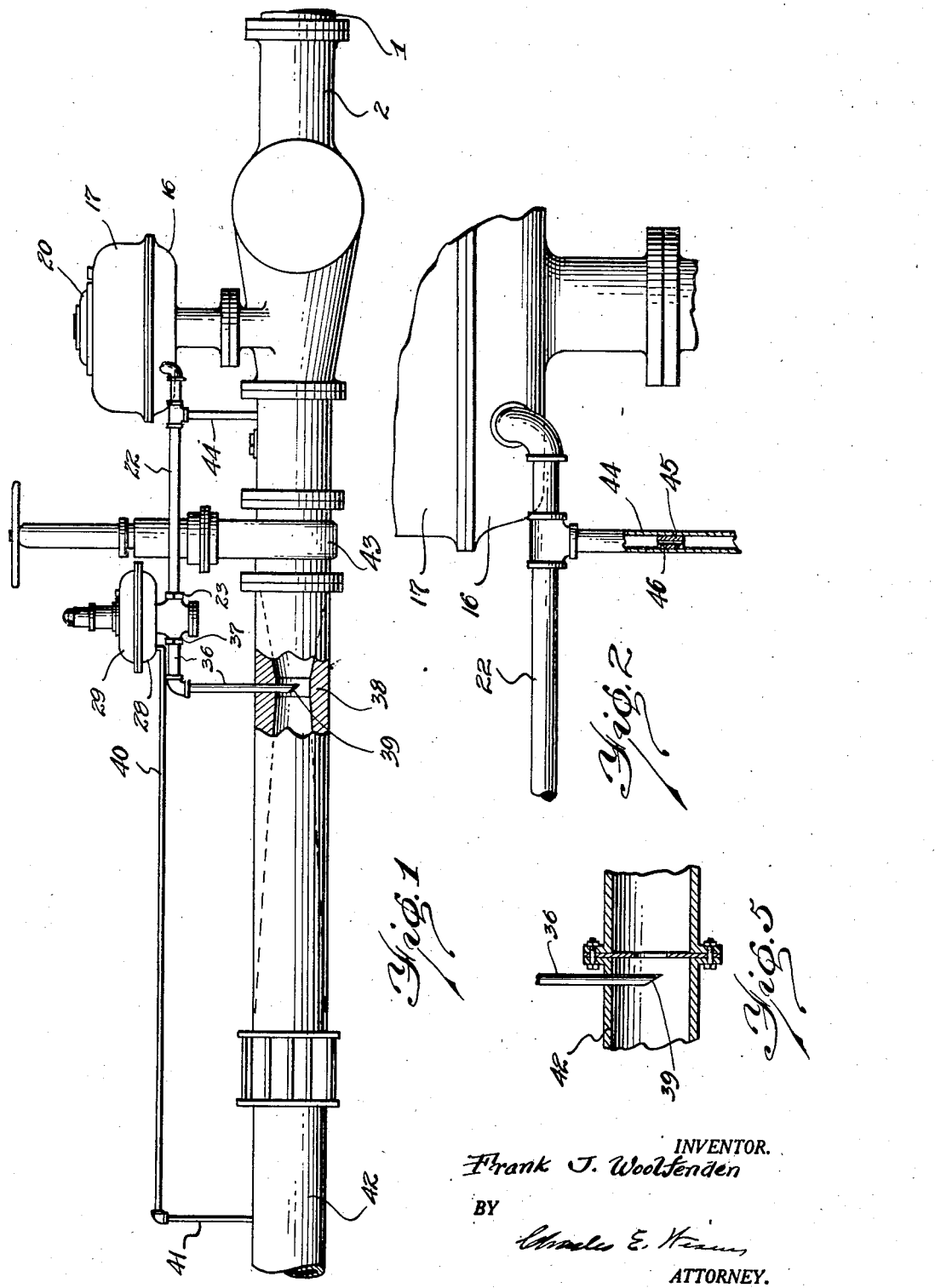
INVENTOR.
Frank J. Woolfenden
BY
Charles E. Hines
ATTORNEY.

Nov. 20, 1934.                F. J. WOOLFENDEN                    1,981,576
                            FLUID PRESSURE REGULATOR
                    Original Filed May 25, 1928    2 Sheets-Sheet 2

INVENTOR.
Frank J. Woolfenden
BY
                    ATTORNEY.

Patented Nov. 20, 1934

1,981,576

UNITED STATES PATENT OFFICE 1,981,576

FLUID PRESSURE REGULATOR

Frank J. Woolfenden, Pittsburgh, Pa., assignor to Pittsburgh Equitable Meter Company, Pittsburgh, Pa.

Application May 25, 1928, Serial No. 280,442
Renewed December 22, 1932

12 Claims. (Cl. 50—16)

This invention relates to fluid pressure regulators and the object of the invention is to provide an arrangement for maintaining a predetermined pressure in a low pressure main under a variable demand.

A further object of the invention is to provide a fluid pressure regulator in which the volume of flow is regulated by a very slight variation in pressure in the low pressure main.

A further object of the invention is to provide a fluid pressure regulator which will automatically increase the flow of fluid during periods of high consumption and reduce the flow of fluid during periods of low consumption.

These objects and the several novel features of the invention are hereinafter more fully described and claimed and the preferred form of construction by which these objects are attained is shown in the accompanying drawings in which—

Fig. 1 is an elevation of a fluid pressure regulator embodying my invention.

Fig. 2 is an enlarged detail of a connection to the main regulator.

Fig. 5 is a section through an alternative form of the low pressure main.

Figure 3:
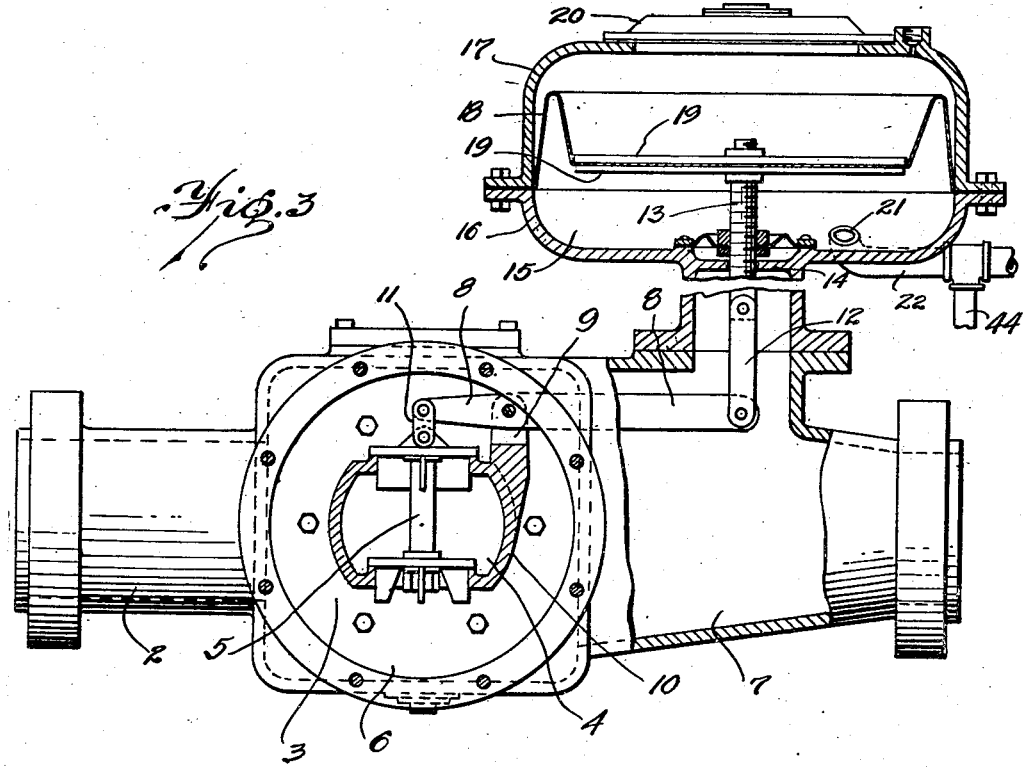
Fig. 3 is a longitudinal section through the main pressure regulator.
Figure 4:
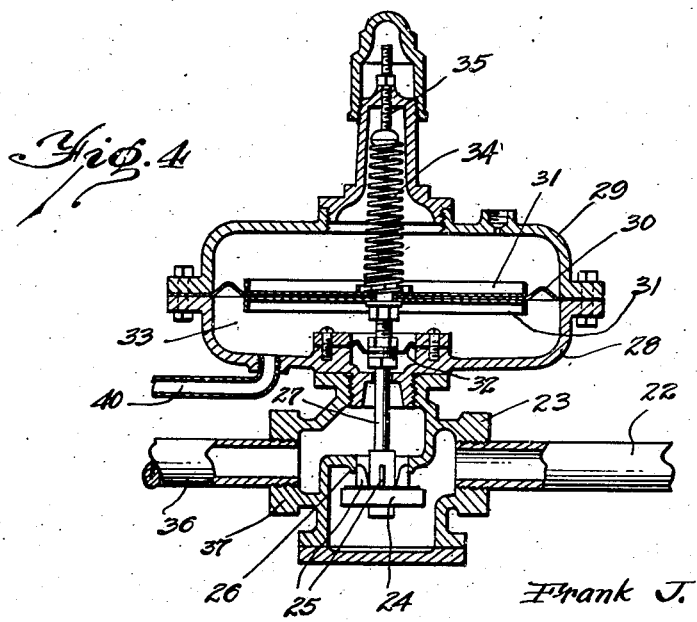
Fig. 4 is a longitudinal section through the control regulator.

As shown in Fig. 1 the high pressure main 1 is connected to the inlet end 2 of a pressure regulator housing. The pressure regulator is shown in reverse position in Fig. 3. The inlet 2 opens through a plate 3 into a chamber 4 which is closed to the outlet but may be opened by upward movement of the double balanced valve 5. When the balanced valve 5 is opened the fluid may flow into the chamber 6 and thence through the chamber 7 into the outlet or low pressure main. An arm 8 is pivotally mounted in a bracket 9 on the wall 10 of the chamber 4 and this lever is pivotally connected at the end by a link 11 to the balanced valve 5. At the opposite end the lever 8 is pivotally connected by means of a link 12 to a stem 13 which is movable vertically through a partition 14 and a small diaphragm is secured to the stem 13 to prevent leakage of fluid into the chamber 15 formed by the housing 16. A housing 17 is also provided and a flexible leather diaphragm 18 is secured between the housing 16 and 17. A pair of discs 19 are secured to the upper end of the stem 13 and the diaphragm 18 is clamped between these discs as shown in Fig. 3. A cover 20 is provided on the housing 17 and may be removed to allow weights to be positioned on the disc 19. An opening 21 is provided in the housing 16 and a pipe 22 is threaded into this opening. This pipe 22 as shown in Figs. 1 and 4 is threaded into the outlet end 23 of the valve 24.

The valve 24 is provided with guide members 25 and a seat 26 and a valve stem 27 is provided which extends into the lower half 28 of the control pressure regulator housing. The upper part 29 of the housing is bolted to the lower part and a flexible diaphragm 30 is secured between the two housing parts. A pair of discs 31 are secured to the upper end of the stem 27 and the flexible leather diaphragm is secured therebetween. A smaller diaphragm 32 is secured to the stem 27 and prevents leakage into the chamber 33 beneath the diaphragm 30. A coiled spring 34 is mounted on top of the diaphragm disc 31 and an adjustable screw 35 is provided whereby the tension of the spring 34 may be regulated. A pipe 36 is connected to the inlet end 37 of the valve 24 and this pipe 36 extends into the center of the throat of a venturi 38. The lower end 39 of the pipe 36 is cut off at an angle as shown so that flow through the venturi to the left of Fig. 1 tends to reduce the pressure in the pipe 36. As shown in Figs. 1 and 4 a pipe 40 opens through the housing 28 into the chamber 33 of the control pressure regulator. This pipe, as shown in Fig. 1, is provided with a depending portion 41 which opens into the low pressure main 42. A gate valve 43 is connected between the main pressure regulator and the venturi 38 and a pipe 44 is connected by a T to the pipe 22 and opens into the low pressure main between the outlet of the main pressure regulator and the gate valve 43. This pipe 44 as shown in Fig. 2, is provided with a plug 45 having a restricted orifice 46 as shown.

The gate valve 43 is merely a shut off valve to shut off the high pressure main from the low pressure main and forms no particular part of the invention.

Under periods of normal operation when the demand is low the control pressure regulator need not be considered as the valve 24 remains wide open during such periods. When this valve 24 is open the main regulator functions in the ordinary manner and the fluid flowing through the venturi 38 reduces the pressure in chamber 15 and beneath the diaphragm 18 through the pipes 36 and 22 to open the valve 5 to meet the demand and slight variations in demand will vary the opening of the balanced valve 5 in this manner to provide a supply for the demand. The principal object of this invention is to raise the pressure in the low pressure main during peak periods or periods of high consumption to insure a satisfactory supply to all users in the district. As the peak demand comes on in the low pressure main the velocity of flow through the venturi 38 is considerably increased thus considerably reducing the pressure in the chamber 15 of the main pressure regulator and further opening the valve 5. As the valve 5 is further opened the velocity of flow through the venturi 38 is further increased which further reduces the pressure in the chamber 15 of the main pressure regulator thus further opening the balanced valve 5.

This is what is known as a "building" effect and the object of my invention is to make use of this "building" effect to increase the pressure in the low pressure main during periods of high consumption. As this "building" effect increases flow beyond the demand it builds pressure in the low pressure main and as this pressure reaches the point to which the spring 34 of the control pressure regulator is set it is communicated through the pipes 41 and 40 to the chamber 33 of the control pressure regulator thus raising the valve 24 to the closed position. At this time fluid may pass slowly through the restricted orifice 46 and the pipe 44 and into the chamber 15 of the main pressure regulator tending to build pressure in this chamber and by movement of the diaphragm move the valve 5 toward the closed position to reduce the supply to the low pressure main.

As the supply is reduced the demand reduces the pressure in the low pressure main allowing the control pressure regulator to open at which time the velocity through the venturi 38 reduces the pressure in the main pressure regulator through the pipes 36 and 22 causing the valve 5 to further open to again produce the "building" effect until it again reaches the pressure at which the control pressure regulator closes the valve 24.

It will thus be seen that any pressure can be maintained in the low pressure main at which the spring 34 is set by the adjusting screw 35 and insures a supply to all district users during a period of high consumption. As the peak demand is reduced the valve 24 opens and remains open and the main pressure regulator continues to function as described heretofore during periods of low consumption. It will thus be seen that this device will increase the pressure in the low pressure main during periods of high consumption and has the advantage over the clock control type of system in that the time that the peak demand comes on has no effect on the operation of the device as my arrangement will take care of a peak demand at any time. When the valves 5 and 24 are opened during normal operation the small amount of fluid passing through the restricted orifice 46 has no effect on the operation of the device due to the considerably greater capacity of the pipes 22 and 36. The valve 5 is preferably designed so that when it is fully opened it will supply fluid to excess of the demand of the low pressure main and thus at most times the valve 5 under normal conditions or under peak load is never fully opened or completely closed but balances at a point between these extremes.

In previous practice the control pressure regulator has not been utilized and the pipes 22 and 36 are usually one continuous pipe. In this form of construction an increased demand increases the velocity past the end 39 of the pipe 36 thus reducing the pressure beneath the diaphragm 18 of the main pressure regulator causing the valve 5 to open further thus further increasing the velocity through the throat of the venturi and further reducing the pressure in the chamber 15 of the main pressure regulator to further open the valve 5. Under this condition a "building" effect is produced which will soon produce a dangerous pressure in the low pressure main and it is to utilize this "building" effect to increase pressure during periods of high consumption that the control pressure regulator is connected in this manner.

An alternative form of construction is shown in Fig. 5 in which an apertured disc is utilized in place of the venturi 38. The aperture in the disc increases the velocity of flow at this point in the low pressure main and the conduit 36 terminates centrally of the disc opening and on the down stream side of the disc as shown. This construction is an equivalent of the Venturi tube and has the advantage that it is much lower in manufacturing cost.

From the foregoing description it becomes evident that the device is very simple and efficient in operation, will not easily get out of order, will automatically increase the pressure to any predetermined point in the low pressure main during periods of high consumption and provides a device which accomplishes the objects described.

Having thus fully described my invention, its utility and mode of operation, what I claim and desire to secure by Letters Patent of the United States is—

1. In an apparatus of the character described, the combination of high and low pressure mains, valve means controlling passage between said mains, a valve operating regulator including a casing, a diaphragm in said casing, and a closed chamber to one side of said diaphragm, a flow restriction in the low pressure main, a conduit providing communication between the said chamber and the restriction whereby said diaphragm is responsive solely to pressure in said conduit, a valve in the said conduit, a control pressure regulator for operating said last-mentioned valve including a casing, a diaphragm in said casing, and a chamber to one side of said diaphragm, adjustable means for placing a tension on the side of the said diaphragm opposite the chamber, a branch conduit opening into the aforesaid conduit at one end and into the low pressure main at the other end, flow restricting means in said branch conduit, and a conduit connecting the chamber of the said control pressure regulator with the low pressure main.

2. In an apparatus of the character described, the combination of high and low pressure mains, valve means controlling passage between the said mains, a main pressure regulator connected to operate said valve means, a venturi in the low pressure main, a conduit placing the main pressure regulator solely in communication with the low pressure main at the throat of the venturi, a valve controlling flow through the said conduit, a control pressure regulator connected to operate said last-mentioned valve, a branch conduit opening at one end into the low pressure main ahead of the venturi and opening at the opposite end into the aforesaid conduit, a plug in the last named conduit having a restricted orifice, and a conduit placing the control pressure regulator in communication with the low pressure main beyond the said venturi.

3. In an apparatus of the character described, the combination of high and low pressure mains, valve means controlling passage between the said mains, a main pressure regulator connected to operate said valve means, a venturi in the low pressure main, a conduit connected at one end to the main pressure regulator and extending at the other end centrally into the throat of the venturi whereby said regulator is responsive solely to pressure at the throat of the venturi, a valve in the said conduit, a control pressure regulator connected to operate the said last mentioned valve, a branch conduit between the aforesaid conduit and the low pressure main arranged to allow restricted flow therethrough, and a conduit connected to the control pressure regulator and opening into the low pressure main.

4. In an apparatus of the character described, the combination of high and low pressure mains, valve means controlling passage between the said mains, a main pressure regulator connected to operate said valve means, a venturi in the low pressure main, a conduit placing the main pressure regulator solely in communication with the low pressure main at the throat of the venturi, a control pressure regulator controlling flow in the said conduit, a branch conduit connecting the control pressure regulator with the low pressure main, a pipe opening into the conduit for the main pressure regulator at one end and opening into the low pressure main at the other end and flow restricting means in the said pipe.

5. In an apparatus of the character described, the combination of high and low pressure mains, valve means controlling passage between the said mains, a main pressure regulator connected to operate said valve means, a venturi in the low pressure main, a conduit placing the main pressure regulator solely in communication with the low pressure main at the throat of the said venturi, a valve in the said conduit, a control pressure regulator connected to operate the said last-mentioned valve, a flow restricting conduit placing the low pressure main in communication with the main pressure regulator and a conduit placing the control pressure regulator in communication with the low pressure main.

6. In an apparatus of the character described, the combination of high and low pressure mains, valve means controlling passage between the said mains, a main pressure regulator connected to operate the said valve means, means in the low pressure main for increasing velocity, a conduit placing the main pressure regulator solely in communication with the low pressure main at the point of greatest velocity, a valve in the said conduit, a control pressure regulator connected to operate the said last-mentioned valve, a pipe arranged for limited flow opening into the said conduit at one end and opening into the low pressure main at the other end, and a conduit placing the control pressure regulator in communication with the low pressure main.

7. In an apparatus of the character described, the combination of high and low pressure mains, valve means controlling passage between the said mains, a main pressure regulator connected to operate said valve means, flow restricting means in the low pressure main, a conduit placing the main pressure regulator solely in communication with the low pressure main adjacent the point of flow restriction, a valve in the said conduit, a control pressure regulator connected to operate the said last-mentioned valve, a branch conduit placing the low pressure main in communication with the main pressure regulator, and a conduit placing the control pressure regulator in communication with the low pressure main.

8. A pressure regulator for maintaining substantially constant pressure in a low pressure main during normal demand periods and a higher pressure during peak demand periods with automatic means to limit pressure in the low pressure main within safe limits, comprising high and low pressure mains; a main valve controlling flow between said mains; a main valve operating regulator; a flow restriction in the low pressure main; a conduit connecting said regulator and said restriction; a control valve in said conduit to prevent excessive building up of pressure in said low pressure main; a control valve regulator for operating said control valve, said regulator being connected to respond solely to a predetermined pressure in said low pressure main to close said control valve and thus cut off the main pressure regulator from pressure at the flow restriction in the low pressure main; and means for controlling said main pressure regulator solely by static pressure in the low pressure main when said control valve is closed.

9. A pressure regulator for maintaining substantially constant pressure in a low pressure main during normal demand periods and a higher pressure during peak demand periods with automatic means to limit pressure in the low pressure main within safe limits, comprising high and low pressure mains; a main valve controlling flow between said mains; a main valve operating regulator; a flow restriction in the low pressure main; a conduit connecting said regulator and said restriction; a control valve in said conduit to prevent excessive building up of pressure in said low pressure main; a control valve regulator for operating said control valve, said regulator being connected to respond solely to a predetermined pressure in said low pressure main to close said control valve and thus remove control of the main pressure regulator from the reduced pressure at said flow restriction; a second conduit connecting said main valve operating regulator and static pressure of the low pressure main; and a restriction in said second conduit whereby a restricted flow may pass from the low pressure main to said chamber when the control valve is closed to thereby build up pressure in said main valve operating regulator to close the main valve.

10. A pressure regulator for maintaining substantially constant pressure in a low pressure main during normal demand periods and a higher pressure during peak demand periods with automatic means to limit pressure in said low pressure main within safe limits, comprising high and low pressure mains; a main valve controlling flow between said mains; a main valve operating regulator; a flow restriction in the low pressure main; a conduit connecting said regulator and said restriction; a control valve in said conduit to prevent excessive building up of pressure in said low pressure main; a control valve regulator for operating said control valve, said regulator being connected to respond solely to a predetermined pressure in said low pressure main to close said control valve and thus cut off the main pressure regulator from pressure at the flow restriction in the low pressure main; a second conduit connecting the chamber of said main valve operating regulator and the low pressure main; and a restriction in said second conduit whereby a restricted flow may pass from the low pressure main to said chamber when the control valve is closed.

11. In a pressure governing apparatus the combination of high and low pressure mains and a main valve controlling flow between said mains, a main regulator for operating said valve, means in said low pressure main for producing an area of low pressure, a conduit directly connecting said regulator and said means whereby said low pressure is effective only upon said regulator, a normally open control valve in said conduit to prevent excessive building up of pressure in said low pressure main, a control regulator for closing said control valve when pressure in the main reaches a predetermined maximum, and a conduit connecting said control regulator and the low pressure main.

12. In a pressure governing apparatus the combination of high and low pressure mains and a main valve controlling flow between said mains, a main regulator for operating said valve, means in said low pressure main for producing an area of low pressure, a conduit directly connecting said regulator and said means whereby said pressure is effective only upon said regulator, a normally open control valve in said conduit, means operated by pressure in said low pressure main for closing said control valve when pressure in the main reaches a predetermined maximum and a restricted conduit connecting said main regulator and the low pressure main.

FRANK J. WOOLFENDEN.